US008382567B2

(12) United States Patent
MacIver et al.

(10) Patent No.: US 8,382,567 B2
(45) Date of Patent: Feb. 26, 2013

(54) INTERACTIVE DVD GAMING SYSTEMS

(75) Inventors: Peter MacIver, Huntington Beach, CA (US); Jim Keifer, Manhattan Beach, CA (US); James Zielinski, Hawthorne, CA (US); Matt Thorne, Culver City, CA (US); Ryan Ciociola, Los Angeles, CA (US)

(73) Assignee: Mattel, Inc., El Segundo, CA (US)

( * ) Notice: Subject to any disclaimer, the term of this patent is extended or adjusted under 35 U.S.C. 154(b) by 1170 days.

(21) Appl. No.: 11/199,718

(22) Filed: Aug. 8, 2005

(65) Prior Publication Data
US 2006/0111165 A1 May 25, 2006

Related U.S. Application Data

(60) Provisional application No. 60/625,473, filed on Nov. 3, 2004, provisional application No. 60/630,709, filed on Nov. 23, 2004, provisional application No. 60/668,829, filed on Apr. 5, 2005, provisional application No. 60/670,777, filed on Apr. 12, 2005, provisional application No. 60/683,897, filed on May 23, 2005.

(51) Int. Cl.
*A63F 9/24* (2006.01)

(52) U.S. Cl. .................. 463/9; 463/23; 463/36; 463/40; 463/43; 463/44; 345/156

(58) Field of Classification Search .................. 463/1, 4, 463/9–13, 43, 7, 23, 36, 40, 44, 45; 345/156
See application file for complete search history.

(56) References Cited

U.S. PATENT DOCUMENTS

| | | | |
|---|---|---|---|
| 3,569,937 A | 3/1971 | Heatter | |
| 3,949,986 A | 4/1976 | Breslow | |
| 4,094,079 A | 6/1978 | Dorsett | |
| 4,124,214 A | 11/1978 | Pavis | |
| 4,126,851 A | 11/1978 | Okor | |
| 4,156,928 A | 5/1979 | Inose et al. | |
| 4,359,223 A | 11/1982 | Baer et al. | |
| 4,372,554 A | 2/1983 | Orenstein | |
| 4,475,132 A | 10/1984 | Rodesch | |
| 4,490,810 A * | 12/1984 | Hon ................................ | 463/43 |
| 4,518,164 A | 5/1985 | Hayford, Jr. | |
| 4,571,640 A | 2/1986 | Baer | |
| 4,575,770 A | 3/1986 | Dieterich | |
| 4,623,887 A | 11/1986 | Welles, II | |
| 4,625,244 A | 11/1986 | Cong et al. | |
| 4,626,848 A | 12/1986 | Ehlers | |
| 4,662,635 A | 5/1987 | Enokian | |
| 4,771,283 A | 9/1988 | Imoto | |
| 4,829,431 A | 5/1989 | Ott et al. | |
| 4,840,382 A | 6/1989 | Rubin | |
| 4,855,842 A | 8/1989 | Hayes et al. | |
| 4,856,081 A | 8/1989 | Smith | |
| 4,861,031 A | 8/1989 | Simms | |
| 4,897,827 A | 1/1990 | Raetzer et al. | |

(Continued)

FOREIGN PATENT DOCUMENTS

| EP | 0 572 710 | 8/1992 |
|---|---|---|
| EP | 0 567 687 | 9/1992 |

(Continued)

OTHER PUBLICATIONS

Trivial Pursuit, DVD Pop Culture edition, Horn Abbot Ltd. 2003.*

(Continued)

*Primary Examiner* — Sunit Pandya
(74) *Attorney, Agent, or Firm* — Kolisch Hartwell, PC

(57) ABSTRACT

The present disclosure is directed to DVD gaming systems that include DVD game remote systems having card readers, and methods of playing games using those DVD gaming systems.

8 Claims, 5 Drawing Sheets

U.S. PATENT DOCUMENTS

| | | | |
|---|---|---|---|
| 4,899,370 A | 2/1990 | Kameo et al. | |
| 4,927,147 A | 5/1990 | Delzio | |
| 4,948,126 A | 8/1990 | Drummond | |
| 4,959,734 A | 9/1990 | Foster | |
| 4,959,810 A | 9/1990 | Darbee et al. | |
| 5,088,928 A | 2/1992 | Chan | |
| 5,120,065 A | 6/1992 | Driscoll et al. | |
| 5,212,368 A | 5/1993 | Hara | |
| 5,213,337 A | 5/1993 | Sherman | |
| 5,219,291 A | 6/1993 | Fong et al. | |
| 5,228,077 A | 7/1993 | Darbee | |
| 5,229,763 A | 7/1993 | Nakamaru | |
| 5,251,904 A | 10/1993 | Cruz | |
| 5,255,313 A | 10/1993 | Darbee | |
| 5,295,834 A | 3/1994 | Saunders | |
| 5,314,197 A | 5/1994 | Hersch | |
| 5,331,141 A | 7/1994 | Kaneko | |
| 5,364,108 A | 11/1994 | Esnouf | |
| 5,375,831 A | 12/1994 | Hsien-Chung | |
| 5,382,776 A | 1/1995 | Arii et al. | |
| 5,393,073 A | 2/1995 | Best | |
| 5,398,074 A | 3/1995 | Duffield et al. | |
| 5,401,032 A | 3/1995 | Barnhart et al. | |
| 5,410,326 A | 4/1995 | Goldstein | |
| 5,411,259 A * | 5/1995 | Pearson et al. | 463/36 |
| 5,429,363 A | 7/1995 | Hayashi | |
| 5,450,490 A | 9/1995 | Jensen et al. | |
| 5,524,195 A | 6/1996 | Clanton, III et al. | |
| 5,607,356 A | 3/1997 | Schwartz | |
| 5,607,357 A | 3/1997 | Kim et al. | |
| 5,613,909 A | 3/1997 | Stelovsky | |
| 5,667,220 A | 9/1997 | Cheng | |
| 5,678,012 A | 10/1997 | Kimmich et al. | |
| 5,679,075 A | 10/1997 | Forrest et al. | |
| 5,689,353 A | 11/1997 | Darbee et al. | |
| 5,691,710 A | 11/1997 | Pietraszak et al. | |
| 5,731,801 A | 3/1998 | Fukuzaki | |
| 5,749,735 A | 5/1998 | Redford et al. | |
| 5,764,763 A | 6/1998 | Jensen et al. | |
| 5,781,180 A | 7/1998 | Couch et al. | |
| 5,782,692 A | 7/1998 | Stelovsky | |
| 5,820,462 A | 10/1998 | Yokoi | |
| 5,853,327 A | 12/1998 | Gilboa | |
| 5,855,483 A | 1/1999 | Collins et al. | |
| 5,919,092 A | 7/1999 | Yokoi | |
| 5,956,025 A | 9/1999 | Goulden et al. | |
| 6,100,509 A | 8/2000 | Saito | |
| 6,102,397 A | 8/2000 | Lee et al. | |
| 6,104,334 A | 8/2000 | Allport | |
| 6,127,941 A | 10/2000 | Van Ryzin | |
| 6,160,551 A | 12/2000 | Naughton et al. | |
| 6,167,353 A | 12/2000 | Piernot et al. | |
| 6,208,341 B1 | 3/2001 | Van Ee et al. | |
| 6,213,880 B1 | 4/2001 | Sim | |
| 6,215,952 B1 | 4/2001 | Yoshio et al. | |
| 6,223,348 B1 | 4/2001 | Hayes et al. | |
| 6,225,938 B1 | 5/2001 | Hayes et al. | |
| 6,229,952 B1 | 5/2001 | Nonomura et al. | |
| 6,264,559 B1 | 7/2001 | Lawrence et al. | |
| 6,267,379 B1 | 7/2001 | Forrest et al. | |
| 6,290,565 B1 | 9/2001 | Galyean, III et al. | |
| 6,306,036 B1 | 10/2001 | Burns et al. | |
| 6,309,275 B1 | 10/2001 | Fong et al. | |
| 6,327,459 B2 | 12/2001 | Redford et al. | |
| 6,358,111 B1 | 3/2002 | Fong et al. | |
| 6,375,535 B1 | 4/2002 | Fong et al. | |
| 6,375,566 B1 | 4/2002 | Yamada | |
| 6,419,232 B1 | 7/2002 | Sturdevant, II | |
| 6,422,558 B1 | 7/2002 | Chambers | |
| 6,437,836 B1 | 8/2002 | Huang et al. | |
| 6,443,796 B1 | 9/2002 | Shackelford | |
| 6,454,625 B1 | 9/2002 | Fong et al. | |
| 6,456,494 B1 * | 9/2002 | Tagawa et al. | 361/724 |
| 6,460,851 B1 | 10/2002 | Lee et al. | |
| 6,475,083 B1 | 11/2002 | Gomez et al. | |
| 6,497,412 B1 | 12/2002 | Bramm | |
| 6,497,604 B2 | 12/2002 | Fong et al. | |
| 6,497,606 B2 | 12/2002 | Fong et al. | |
| 6,498,567 B1 | 12/2002 | Grefenstette et al. | |
| 6,512,511 B2 | 1/2003 | Willner et al. | |
| 6,520,504 B2 | 2/2003 | Loder | |
| 6,524,188 B2 | 2/2003 | Wang | |
| 6,527,191 B1 | 3/2003 | Jannersten | |
| 6,565,440 B2 | 5/2003 | Hames | |
| 6,565,441 B1 | 5/2003 | Hames | |
| 6,582,308 B1 | 6/2003 | Yamajiri et al. | |
| 6,581,067 B1 | 7/2003 | Darbee et al. | |
| 6,587,067 B2 | 7/2003 | Darbee et al. | |
| 6,612,501 B1 * | 9/2003 | Woll et al. | 235/494 |
| 6,640,337 B1 | 10/2003 | Lu | |
| 6,641,454 B2 | 11/2003 | Fong et al. | |
| 6,650,867 B2 | 11/2003 | Redford et al. | |
| 6,657,500 B1 | 12/2003 | Flinn | |
| 6,657,550 B1 | 12/2003 | Flinn | |
| 6,659,836 B1 | 12/2003 | Yamasaki et al. | |
| 6,692,358 B2 | 2/2004 | Lawrence et al. | |
| 6,694,356 B1 | 2/2004 | Philyaw | |
| 6,709,336 B2 | 3/2004 | Siegel et al. | |
| 6,735,324 B1 | 5/2004 | McKinley et al. | |
| 6,739,874 B2 | 5/2004 | Marcus et al. | |
| 6,752,719 B2 | 6/2004 | Himoto et al. | |
| 6,761,310 B2 | 7/2004 | May | |
| 6,761,315 B2 | 7/2004 | Kato et al. | |
| 6,773,349 B2 | 8/2004 | Hussaini et al. | |
| 6,786,826 B2 | 9/2004 | Himoto et al. | |
| 6,792,292 B1 * | 9/2004 | Chatani | 455/566 |
| 6,803,874 B1 | 10/2004 | Weber | |
| 6,804,786 B1 | 10/2004 | Chamley et al. | |
| 6,811,084 B2 | 11/2004 | Tatsuta et al. | |
| 6,811,491 B1 | 11/2004 | Levenberg et al. | |
| 6,814,294 B2 | 11/2004 | Liston et al. | |
| 6,814,662 B2 * | 11/2004 | Sasaki et al. | 463/1 |
| 6,826,370 B2 | 11/2004 | Escobosa et al. | |
| 6,826,371 B1 | 11/2004 | Escobosa et al. | |
| 6,826,628 B2 | 11/2004 | Huang | |
| 6,830,182 B2 | 12/2004 | Izuyama | |
| 6,966,837 B1 | 11/2005 | Best | |
| 6,987,925 B2 | 1/2006 | Kinzer et al. | |
| 7,003,598 B2 | 2/2006 | Kavanagh | |
| 7,115,032 B2 | 10/2006 | Cantu | |
| 2001/0008849 A1 | 7/2001 | Komata | |
| 2001/0027560 A1 | 10/2001 | Simon | |
| 2002/0020745 A1 | 2/2002 | Yap et al. | |
| 2002/0028710 A1 | 3/2002 | Ishihara et al. | |
| 2002/0034980 A1 | 3/2002 | Lemmons et al. | |
| 2002/0040929 A1 | 4/2002 | Bramucci | |
| 2002/0077180 A1 | 6/2002 | Swanberg et al. | |
| 2002/0140855 A1 | 10/2002 | Hayes et al. | |
| 2002/0179807 A1 * | 12/2002 | Jitsukawa | 248/638 |
| 2002/0193157 A1 * | 12/2002 | Yamada et al. | 463/9 |
| 2003/0001016 A1 | 1/2003 | Fraier et al. | |
| 2003/0027633 A1 | 2/2003 | Hames | |
| 2003/0155714 A1 | 8/2003 | Higashida | |
| 2003/0190961 A1 | 10/2003 | Seidman | |
| 2003/0199292 A1 | 10/2003 | Greenberg | |
| 2003/0218064 A1 * | 11/2003 | Conner et al. | 235/439 |
| 2003/0220142 A1 * | 11/2003 | Siegel | 463/37 |
| 2004/0001078 A1 | 1/2004 | Rosing et al. | |
| 2004/0002387 A1 | 1/2004 | Grady | |
| 2004/0014524 A1 | 1/2004 | Pearlman | |
| 2004/0023719 A1 | 2/2004 | Hussaini et al. | |
| 2004/0048642 A1 | 3/2004 | Kinzer et al. | |
| 2004/0054826 A1 * | 3/2004 | Kavanagh | 710/62 |
| 2004/0066377 A1 | 4/2004 | Ha | |
| 2004/0080111 A1 | 4/2004 | Adair, Jr. | |
| 2004/0125075 A1 | 7/2004 | Diercks | |
| 2004/0125080 A1 | 7/2004 | Ha et al. | |
| 2004/0132533 A1 | 7/2004 | Leifer | |
| 2004/0140997 A1 | 7/2004 | Gravina et al. | |
| 2004/0140998 A1 | 7/2004 | Gravina et al. | |
| 2004/0166915 A1 | 8/2004 | Robarge | |
| 2004/0224763 A1 | 11/2004 | Lum et al. | |
| 2004/0229695 A1 | 11/2004 | Hussaini et al. | |
| 2004/0266529 A1 * | 12/2004 | Chatani | 463/40 |
| 2005/0014563 A1 * | 1/2005 | Barri | 463/43 |
| 2005/0026699 A1 * | 2/2005 | Kinzer et al. | 463/43 |
| 2005/0070361 A1 | 3/2005 | Lau | |

| | | | |
|---|---|---|---|
| 2005/0097437 | A1 | 5/2005 | Green |
| 2005/0113164 | A1 | 5/2005 | Buecheler et al. |
| 2005/0187024 | A1 | 8/2005 | Cho et al. |
| 2005/0202871 | A1 | 9/2005 | Lippincott |
| 2005/0227764 | A1 | 10/2005 | Cantu et al. |
| 2005/0232577 | A1 | 10/2005 | Green |
| 2005/0248526 | A1* | 11/2005 | Twerdahl et al. ............ 345/156 |
| 2005/0288098 | A1 | 12/2005 | Tse |
| 2006/0089193 | A1 | 4/2006 | Buecheler et al. |

FOREIGN PATENT DOCUMENTS

| | | |
|---|---|---|
| EP | 1400267 | 3/2004 |
| EP | 1629870 | 1/2006 |
| GB | 2234446 | 6/1991 |
| GB | 2310481 | 8/1997 |
| GB | 2422466 | 7/2006 |
| JP | 2002/136766 | 5/2002 |
| WO | WO01/03788 | 1/2001 |
| WO | WO02/01494 | 1/2002 |
| WO | WO02/50632 | 6/2002 |
| WO | WO03/018156 | 3/2003 |
| WO | WO03/094519 | 4/2003 |
| WO | WO2004/007042 | 1/2004 |
| WO | WO2004/010389 | 1/2004 |
| WO | WO2004/081765 | 9/2004 |
| WO | WO2005/008428 | 1/2005 |
| WO | WO2006/075194 | 7/2006 |

OTHER PUBLICATIONS

"Anyone can be a Millionaire on DVD this Christmas", Nov. 2002, Zoo Digital Group plc (3 pages).
"Outburst" (game instructions), © 1988, Hersch & Company, 4 pages.
"Taboo" (game instructions), © 1989, Milton Bradley, 2 pages.
"Celebrity Taboo" (game instructions), © 1991, Milton Bradley, 2 pages.
"Outburst Junior" (game instructions), © 1992, Hersch and Company, 3 pages.
"Taboo" (game instructions), © 1999, Hersch and Company, 2 pages.
"Taboo" (game instructions), © 2000, Hersch and Company, 2 pages.
"Outburst Jr!" (game instructions), © 2001, Hersch and Company, 3 pages.
"Electronic Outburst" (game instructions), © 2001, Hersch and Company, 6 pages.
"Outburst!" (game instructions), © 2002, Hersch and Company, 3 pages.
"Scene It?" (game instructions), © 2003, Mattel Inc., 4 pages.
"Taboo For Kids" (game instructions), © 2004, Hersch and Company, 2 pages.
"Celebrity Taboo" (game instructions), © 2004, Hersch and Company, 2 pages.
Scene It? Jr., (game instructions), © 2004, Mattel Inc., 2 pages.
"Scene It?" (game instructions), © 2005, Mattel Inc., 2 pages.
Jeopardy for Sega CD, Sony Imagesoft, 1994, 9 pages.
Sony Playstation gaming system, Sony Electronics, Japan, 1994, Wikipedia, 15 pages.

* cited by examiner

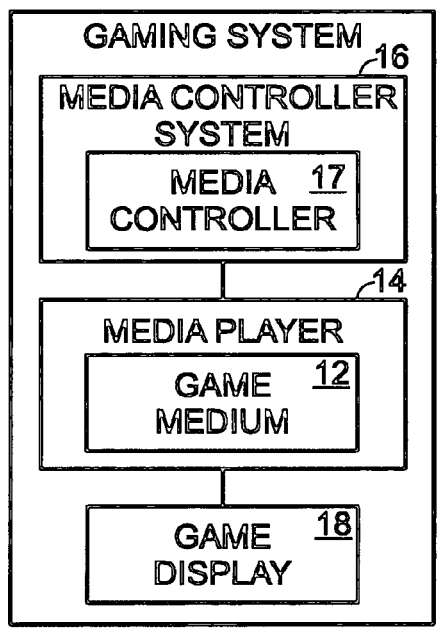
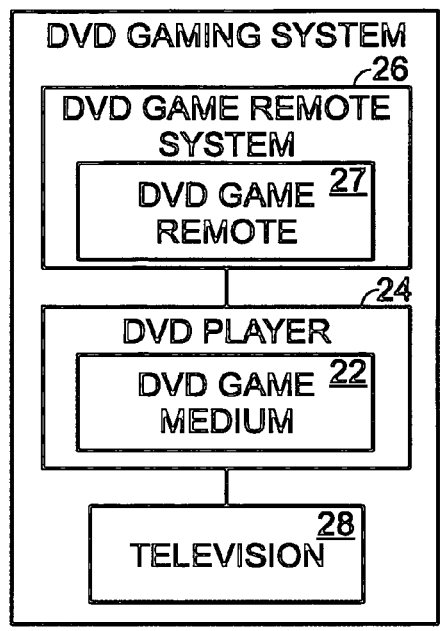
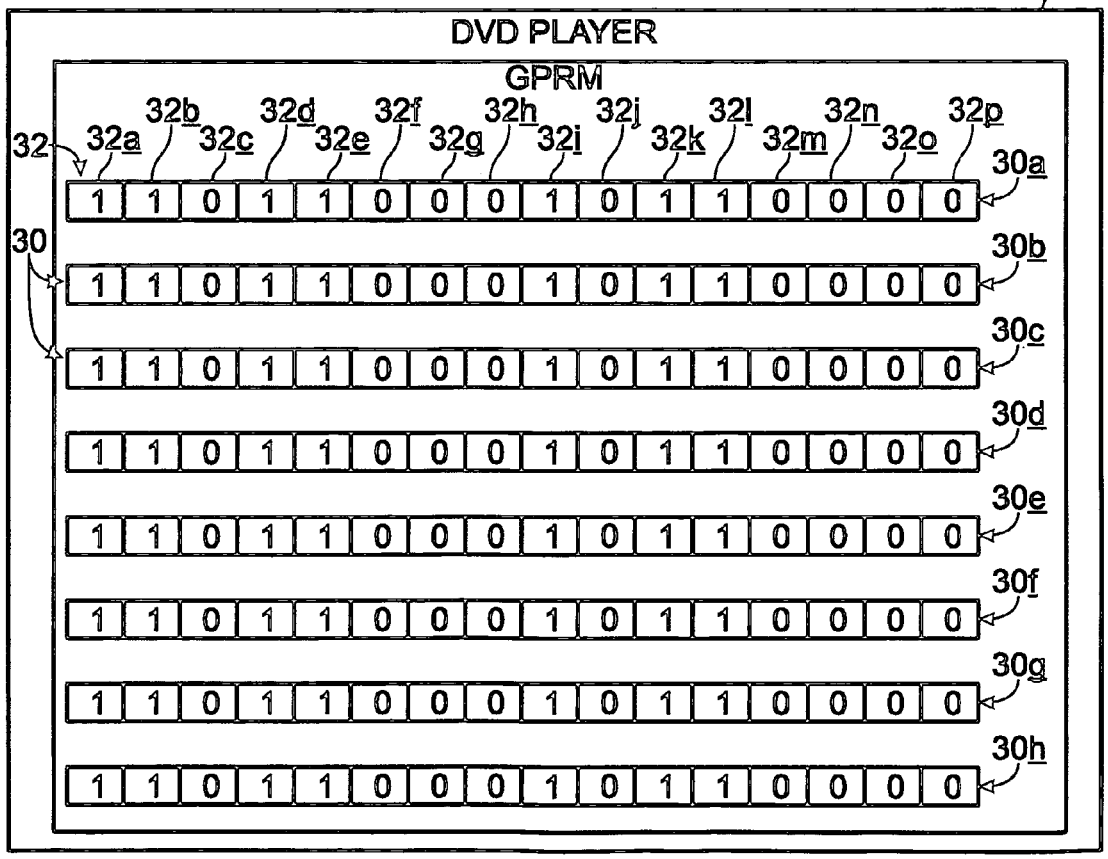

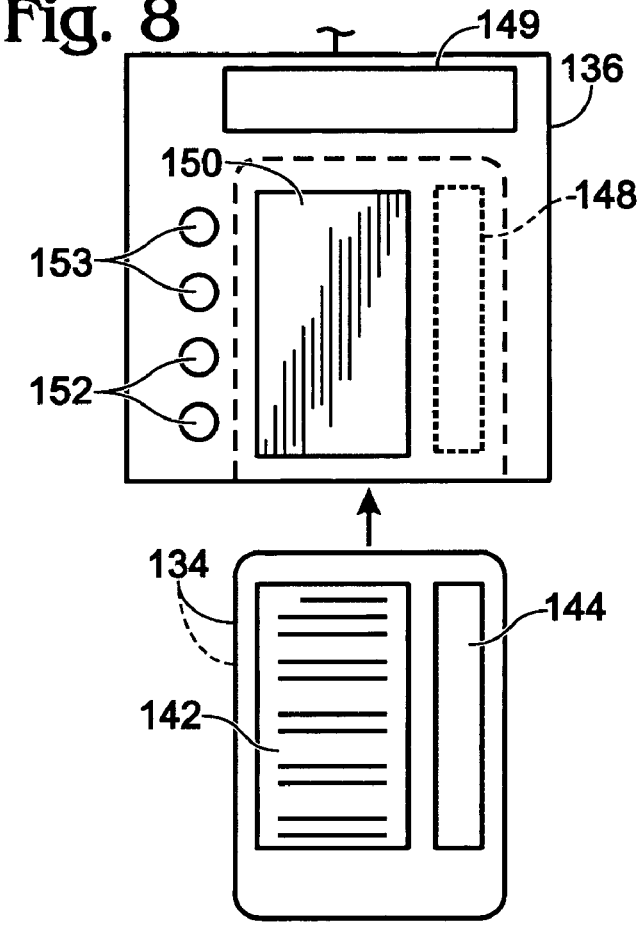
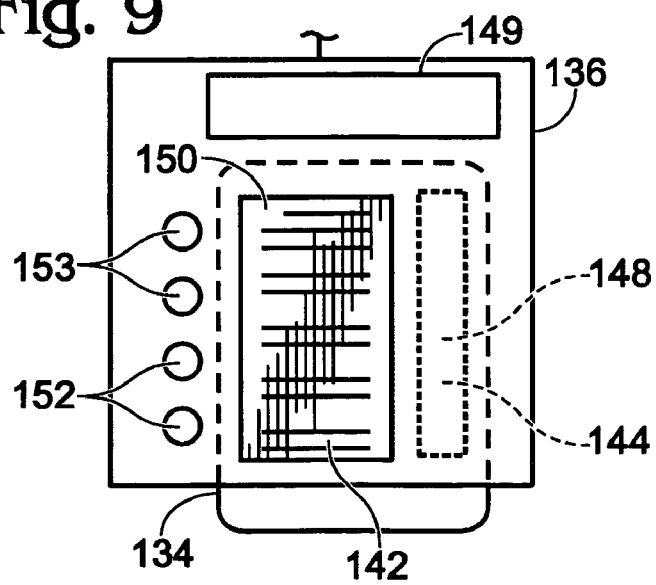

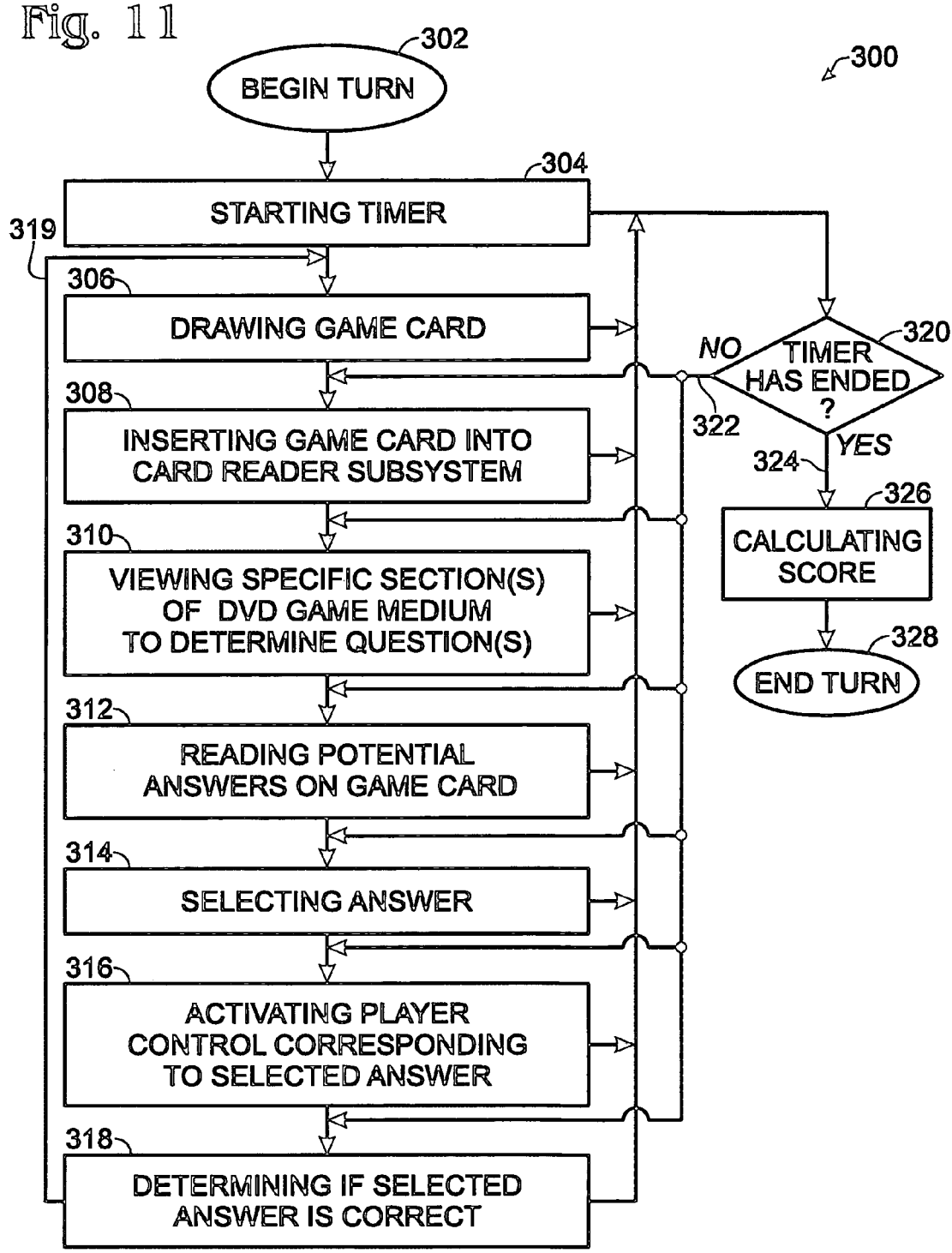

INTERACTIVE DVD GAMING SYSTEMS

CROSS-REFERENCE TO RELATED APPLICATIONS

This application claims priority under 35 U.S.C. §119(e) to U.S. Provisional Patent Application Ser. No. 60/625,473 entitled "Interactive DVD Gaming System," filed Nov. 3, 2004; U.S. Provisional Patent Application Ser. No. 60/630,709 entitled "New Format Learning Platform," filed Nov. 23, 2004; U.S. Provisional Patent Application Ser. No. 60/668,829 entitled "Interactive DVD Gaming System," filed Apr. 5, 2005; U.S. Provisional Patent Application Ser. No. 60/670,777 entitled "Interactive DVD Gaming Systems," filed Apr. 12, 2005; and U.S. Provisional Patent Application Ser. No. 60/683,897 entitled "DVD Duo Tone LCD Text Device DVD Gaming System Remote Game Device," filed May 23, 2005. The complete disclosures of the above applications are herein incorporated by reference for all purposes.

BACKGROUND OF THE DISCLOSURE

The present disclosure is directed to gaming systems that include Digital Versatile Disc (DVD) players, particularly those systems that also include card readers. Examples of gaming systems that include DVD players and/or card readers are found in U.S. Pat. Nos. 6,814,294; 6,811,084; 6,803,874; 6,761,315; 6,735,324; 6,709,336; 6,694,356; 6,650,867; 6,527,191; 6,520,504; 6,498,567; 6,419,232; 6,327,459; 6,375,566; 6,225,938; 6,223,348; 6,100,509; 5,607,356; 5,411,259; 5,382,776; 5,331,141; 5,212,368; 4,889,370; 4,861,031; and 4,662,635; JP Patent No. JP2003076740; U.S. Patent Application Publication Nos. 2005/0026699; 2005/0014563; 2004/0166915; 2004/0054826; 2004/0048642; 2004/0002387; 2003/0190961; 2003/0155714; 2003/0001016; 2002/0193157; 2002/0140855; 2002/0077180; 2002/0040929; 2002/0028710; 2002/0020745; and 2001/0027560; EP Patent Application Nos. EP 572710 and EP 567687; and PCT Patent Application Nos. WO 2004081765; WO 2003018156; WO 200250632; WO 200201494; and WO 2001003788. The complete disclosures of the above patents and patent applications are hereby incorporated by reference for all purposes.

SUMMARY OF THE DISCLOSURE

Some embodiments provide a DVD game remote system configured to selectively control a DVD player having a DVD game medium. The DVD game remote system includes a game card, a DVD game remote configured to selectively control the DVD player, and a card reader subsystem incorporated with the DVD game remote and configured to obtain game information from the game card. The DVD game remote is configured to transmit one or more game signals to the DVD player responsive, at least in part, to the game information. The one or more game signals are configured to selectively control the DVD player and to facilitate game play.

Some embodiments provide a DVD gaming system for playing a game, including a DVD game medium, a DVD player configured to play the DVD game medium, a game card, a DVD game remote configured to selectively control the DVD player, and a card reader subsystem incorporated with the DVD game remote and configured to obtain game information from the game card. The DVD game remote is configured to transmit one or more game signals to the DVD player responsive, at least in part, to the game information. The one or more game signals are configured to selectively control the DVD player and to facilitate game play.

Some embodiments provide a method of playing a game with a DVD game remote and a DVD player having a DVD game medium, including drawing a game card, processing the game card via a card reader of the DVD game remote, and viewing one or more sections of the DVD game medium to facilitate game play.

BRIEF DESCRIPTION OF THE DRAWINGS

FIG. 1 is a block diagram of a gaming system.

FIG. 2 is a block diagram of a DVD gaming system.

FIG. 3 is a block diagram of a DVD player of the DVD gaming system of FIG. 2, showing eight general parameter register memories (GPRMs), each GPRM having sixteen bits.

FIG. 8 is a block diagram of another embodiment of a card reader subsystem and a game card for the DVD game remote of FIG. 6.

FIG. 9 is a block diagram of the card reader subsystem and the game card of FIG. 8 showing the game card in the card reader subsystem.

FIG. 11 is a flowchart describing a method of play of another game using the DVD gaming system of FIG. 2.

DETAILED DESCRIPTION OF THE DISCLOSURE

Figure 4:
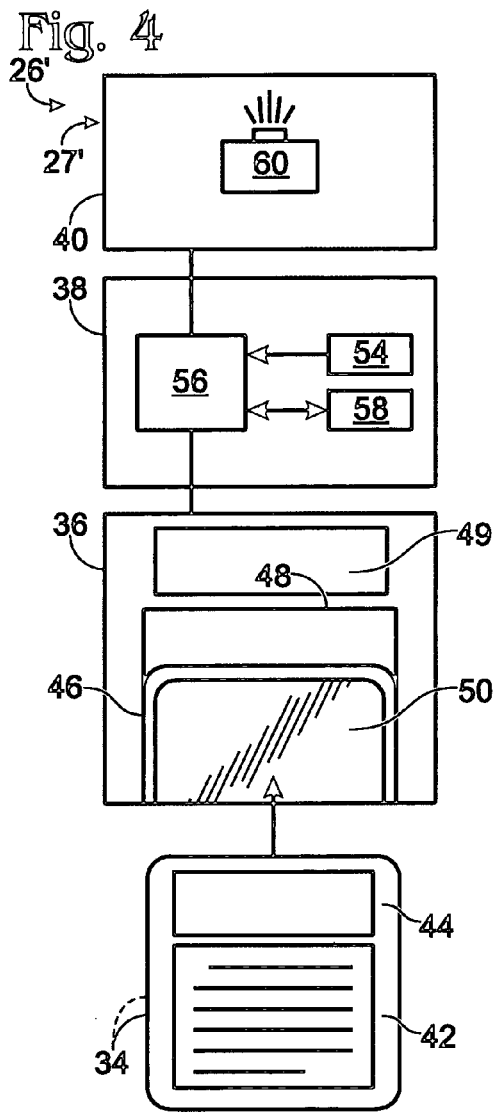
FIG. 4 is a block diagram of a DVD game remote of the DVD gaming system of FIG. 2.

Digital Versatile Discs, or DVDs, are optically-readable media capable of storing relatively large quantities of digital information, which may be subsequently accessed by a complementarily configured DVD player, such as a conventional DVD player, a personal computer DVD player, etc.

Most DVD media are 4.7-inch discs with a 0.05-inch thickness. DVD media store data on spiral tracks, which are read from the media with an extremely fine, precisely aimed laser. Data takes the form of millions of indentations, or "data pits," arranged along the spiral tracks of the media. The data pits refract light, which reduces the intensity of reflected light. Sensors register the difference in reflection intensity as binary data.

DVD media generally have a greater storage density and increased stability when compared to many other storage media, such as magnetic storage media or other optical storage media, such as compact discs (CDs). For example, DVD media are capable of storing more tracks per disc than a CD because the tracks may be placed closer together on DVDs than on CDs. The distance between tracks, or "track pitch," is approximately 0.74-microns, which is less than half that of a CD (1.6-microns). Also, the data pits on a DVD are considerably smaller than on a CD. Accordingly, the average DVD media holds four times the number of data pits that can be held by a CD. The average capacity of a single-sided, single-layered DVD is 4.7-gigabytes (GB).

Some DVD media utilize techniques such as layering and two-sided manufacturing to achieve even larger storage capacities. With layering, DVD media may be constructed with two layers, the outer layer of which is semi-transparent to allow reading of an underlying layer. The reading laser may operate at a relatively high intensity to read the inner layer, and a relatively low intensity to read the outer layer. A single-sided, double-layered DVD has a storage capacity of approximately 8.5-GB. To increase storage capacity to approximately 17-GB, both sides of a disc can be used to store digital information.

Also, the efficiency of the data structure on a DVD is generally much better than that of a CD. When CDs were first developed, considerable error correction was necessary to ensure that a CD would play correctly. Therefore, more bits were used for error detection and correction, which limited the capacity of a CD to carry usable digital information. The more efficient error correction code used with a DVD allows increased capacity for usable digital information.

Data on DVD media may be stored in a variety of formats. For example, computer applications, files, and other data may be stored using the DVD-ROM format. High quality audio may be stored using the DVD-A format. Full-length feature films are commonly stored on DVD media using the DVD-Video Standard, which utilizes MPEG-2 video compression and decompression.

DVD-Video discs are typically formatted to include up to 99 titles, which may each be subdivided into 99 chapters. Therefore, there are generally about 9,800 total chapters available on each disc. Each chapter may contain a "scene" comprised of audio or video information, or some combination thereof, which linearly plays from beginning to end. A particular chapter may, however, not be dynamically altered. In other words, the content of each chapter does not change from one viewing to the next. Each chapter may additionally, or alternatively, contain information, such as scripts and stories used herein to refer to instructions readable and executable by a conventional DVD player.

Typical game media includes code executed by a game processor to establish a game engine. That game engine generates a "scene" based on input received from a user or based on random calculations performed by the game processor, and/or dynamically alters such a scene in real-time. A DVD-Video disc, in contrast, may be practically limited to showing no more than about 9,800 pre-recorded scenes. Such scenes may, however, be played in any order or in any combination.

Also, typical gaming consoles, such as pay-to-play arcade games, personal computers, and hand-held gaming devices, are equipped with large amounts of random access memory (RAM) to hold game information. Conventional DVD players, in contrast, are not equipped with RAM specifically configured for gaming purposes. In general, conventional DVD players are designed for the sole purpose of playing high quality audio and video content. Therefore, in order to keep costs low, conventional DVD players are typically equipped with the minimum amount of resources to play encode audio and video content. Thus, because large amounts of RAM are not needed for this purpose, conventional DVD players do not include large amounts of RAM.

Furthermore, the above-mentioned gaming systems are usually capable of receiving a series of real-time commands in rapid succession from a game controller, such as a joystick or a tethered control pad. In contrast, because the only required input are playback control commands such as "Play," "Pause," "Stop," "Fast Forward," "Rewind," "Menu," "Enter," etc., which typically are not executed immediately one after the other, conventional DVD players typically include infrared input that is not configured to receive a series of real-time commands in rapid succession.

Conventional DVD players, however, typically include a minimal amount of onboard memory to enable the menu features of some DVDs, and to facilitate playing one of several possible alternate audio tracks, using one of several possible camera angles, displaying one of several possible subtitles, etc. Accordingly, some embodiments of the DVD gaming system of this disclosure include DVD media having scripts recorded thereon that are readable by a conventional DVD player. Those scripts allow the DVD media to use the available memory of the DVD player to define game variables, which in turn may be used to control game flow. In these and other embodiments, such variables may be used by scripts on the DVD to implement a series of logical decisions based on the held values of the one or more game variables, on user-provided input, or some combination thereof. These decisions may include performing actions, such as implementing other scripts, setting or modifying values of game variables, playing a specific scene or combination of scenes, or any combination thereof, to enable game play. As an example, some game variables may be used to track or change scores for one or more players of the game, and/or may be used to start, stop, and/or display a timer of the game.

FIG. 1 shows a block diagram of a gaming system 10. The gaming system may include at least one game medium 12, a media player 14, a media controller system 16, a media controller 17, and a game display 18. Game medium 12 may include stored information that may be utilized by media player 14 to present a game on game display 18. Media controller system 16 may serve as an interface between a user and the gaming system, so that the user may interactively control the game. Gaming system 10 may be configured in various embodiments. For example, game medium 12 may take the form of a DVD or another suitable storage medium. Similarly, media player 14 may take the form of a conventional DVD player if the gaming system utilizes DVD game media, or, if another type of game medium is used, a media player that may be complementarily configured to play that type of medium.

Media controller system 16 may include media controller 17 that is an external input source, such as a general purpose controller configured to control a number of different games, or a game-specific controller particularly configured for use with a particular game. The media controller system may include additional components configured to be used with media controller 17 to facilitate game play. The particular embodiments of gaming system 10 that are described below should not be considered as limiting, but rather as providing illustrative examples of the numerous possible configurations and features that are within the scope of this disclosure.

FIG. 2 shows some embodiments of game system 10, in the form of a DVD gaming system 20. DVD gaming system 20 may include at least one DVD game medium 22, a DVD player 24, a DVD game remote system 26, a DVD game remote 27, and a television 28. DVD game system 20 may be configured to play games on DVD player 24. DVD game remote system 26 may include one or more components configured to be used with DVD game remote 27 to facilitate game play on DVD player 24.

The digital information stored on DVD game medium 22 may be formatted and arranged to utilize the minimal memory of DVD players, such as DVD player 24. DVD game medium 22 may store information corresponding to one or more games, and different DVD game media may store information corresponding to other games. Various DVD game media may be used to play different games on DVD player 24, including DVDs that were primarily intended for non-game uses, such as pre-recorded movies, TV shows, documentaries, cooking shows, etc. In contrast to standard gaming consoles that require proprietary players to play proprietary and/or standard media, DVD player 24 may not need to be specially configured to play games stored on DVD game medium 22. Instead, DVD game medium 22 may include information instructing DVD player 24 to store variables and implement logical decisions based on the values of the variables, to enable a user to play a game or games via DVD gaming system 20.

In FIG. 3, DVD player 24 is shown schematically to include eight general parameter register memories (GPRMs) 30, each of which is configured to hold sixteen bits 32 of data. Therefore, DVD player 24 may include 128 bits of memory. Each bit 32 is typically capable of holding one of two possible values, conventionally represented as a zero or a one. GPRMs are typically provided to enable menu options and for controlling played content.

Although DVD player 24 is shown to include memory storage in the form of eight GPRMs 30, many DVD players may include sixteen GPRMs and 24 system parameter register memories (SPRMs), each of which is configured to hold sixteen bits of data, for a total of 640 bits (or 80 bytes) of memory. Some DVD players include more memory, depending on the configuration and number of GPRMs, SPRMs, and/or other memory storage means. Thus, conventional DVD players, as the term is used in this disclosure, generally include less than 1 kilobyte (1,024 bytes or 8,192 bits) of onboard memory.

Thus, although the capacity of DVD players to store information may be extremely limited as compared with a traditional gaming console, such memory storage may be used to hold data corresponding to one or more game variables, which may be used to control game play. Specifically, GPRMs 30 of DVD player 24 may store game information. For example, if DVD game medium 22 includes a trivia game, the first six bits 32$a$-$f$ of GPRM 30$a$ may be used to hold data corresponding to a "Questions" variable, which may represent the number of questions asked during a particular game. If six bits 32 are allocated to the Questions variable, the variable may hold one of sixty-four ($2^6$) possible values, such as any number from 0 to 63.

Similarly, bit 32$g$ of GPRM 30$a$ may be used to store a "Multiplayer" variable or flag. If only one bit 32 is allocated to the Multiplayer flag, it may hold one of two ($2^1$) possible values. In this manner, it is possible to track whether the current game is a single player game represented, for example, by a held zero, or a multiplayer game, represented by a held one.

As can be seen, each GPRM 30 may be segmented, such as by using bit shifting techniques, to hold more than one variable. Thus, other bits of GPRM 30$a$, as well as GPRMs 30$b$-$h$, may be used to hold other variables. Furthermore, it should be understood that some games may utilize more or fewer GPRMs 30, and/or other storage mechanisms, for holding values corresponding to game variables.

Because DVD gaming system 20 utilizes a DVD player, a user who has already purchased and set up such a DVD player may play games without having to purchase a separate gaming console or connect additional equipment to the user's television, which may not have the appropriate inputs for connecting such equipment. This feature of DVD gaming system 20 may be advantageous to game developers and retailers, because more individuals have access to DVD players than to proprietary game consoles. Thus, games played on a DVD player may appeal to a broader demographic, including individuals who may be unable to, or do not desire to, play games on proprietary gaming consoles.

In some embodiments, DVD player 24 may accept input from DVD game remote system 26', which includes any suitable structure configured to allow players to interact with and/or control DVD gaming system 20. For example, as shown in FIG. 4, DVD game remote system 26' may include one or more game cards 34, a card reader subsystem 36, a data processing subsystem 38, and a communication subsystem 40. The card reader, data processing, communication subsystems, and/or other suitable subsystems may be referred to as DVD game remote 27', which is configured to obtain game information from the one or more game cards and/or transmit one or more game signals to the DVD player responsive, at least in part, to the game information. The one or more game signals may be configured to selectively control the DVD player and/or to facilitate game play.

One or more game cards 34 may have any suitable shape and/or size configured to be readable by card reader subsystem 36. Additionally, the game cards may include any suitable structure configured to facilitate game play and/or allow the card reader subsystem to read the cards and obtain game information from those cards. For example, game cards 34 may include a player-readable portion 42 and a machine-readable portion 44.

The player-readable portion may include at least one of text, alphanumeric code, symbol, figure, color, and/or any suitable combination configured to facilitate game play. For example, player-readable portion 42 may include one or more questions in text form relating to one or more DVD game media 22. Alternatively, or additionally, the player-readable portion may include one or more answers in text form relating to one or more DVD game media 22. The player-readable portion also may include points associated with the questions and/or answers.

Alternatively, or additionally, the player-readable portion may include figures of battling entities, armies, chess pieces, etc. Those figures also may include associated point values. Additionally, or alternatively, at least some of the player-readable portion may include concealed game information not readable by the naked eye but readable through a window of the card reader subsystem.

Machine-readable portion 44 may include any suitable structure configured to store game information and/or, when read by card reader subsystem 36, provide that information to DVD game remote 27'. For example, the machine-readable portion may include a barcode, a magnetic stripe, a microprocessor (such as those used in smart cards or integrated circuit cards), punched holes, and/or any suitable combination. The machine-readable portion may store any suitable game information, such as questions, question categories, answers, specific chapters or time codes on the DVD game medium to be played, points associated with the questions and/or answers, etc.

Although the player-readable and machine-readable portions are shown in specific locations on game cards 34, those portions may be in any suitable location on game cards 34. Additionally, although the player-readable and machine-readable portions are shown in FIG. 4 to have specific sizes, those portions may be any suitable size. Moreover, although only one player-readable portion and one machine-readable portion are shown, any suitable number of player-readable and/or machine-readable portions may be used. Furthermore, although the player-readable and machine-readable portions are shown to be on the same side of game cards 34, those portions may be on different sides of the game cards, both sides of the cards, or any suitable combination.

Card reader subsystem 36 may include any suitable structure configured to obtain game information from game cards 34 and/or provide at least some of that information to data processing subsystem 38. For example, the card reader subsystem may include a card holder 46, a card reader 48, a display 49, and a window 50. Card holder 46 may include any suitable structure configured to secure one or more game cards 34 to allow card reader 48 to obtain game information from those cards. For example, card holder 46 may include guiding rails, card inlets, card outlets, belts, motors, guides, rollers, and/or any suitable combination.

Card reader 48 may include any suitable structure configured to obtain game information from one or more cards 34. For example, card reader 48 may include one or more optical sensors configured to read barcodes, one or more magnetic heads configured to read magnetic stripes, one or more integrated circuit interfaces configured to connect to and access microprocessors, and/or any suitable combination. Card reader 48 also may include additional suitable components configured to allow the card reader to obtain game information from cards 34, such as belts, motors, guides, rollers, and/or any suitable combination. For example, where the game card includes a magnetic stripe and is held stationary by card holder 46, then card reader 48 may include motors, rollers, and/or the like to allow one or more magnetic heads to move relative the game card and/or vice-versa to read the magnetic stripe.

Display 49 may include any suitable structure configured to display at least some of the game information from the machine-readable portion of game cards 34. For example, display 49 may be in the form of a liquid crystal display (LCD), light emitting diodes (LED) display, etc. Display 49 may be used to provide "secret" game information to the player that is not displayed in television 28 to the other players.

Window 50 may include any suitable structure configured to allow the player see at least some of the player-readable portions when the game card is in the card reader subsystem. For example, windows may be in the form of one or more clear sections in the card reader subsystem. Additionally, or alternatively, the windows may be in the form of one or more reading filter sections configured to allow the player to read the concealed game information on the player-readable portions of game cards 34. For example, the windows may include a "red-filter" configured to reveal concealed game information on game cards 34. Alternatively, windows 50 may be any suitable combination of clear and reading filter sections.

Card reader subsystem 36 may include additional suitable components configured to allow the card reader subsystem to obtain game information from game cards 34 and/or provide that information to data processing subsystem 38. For example, the card reader subsystem may include interfaces, such as interface wires, interface cables, etc. Examples of card reader subsystems are provided in U.S. Pat. Nos. 6,830,182; 6,826,628; 6,761,310; and 6,742,706. The complete disclosures of those patents are herein incorporated by reference for all purposes.

Although the card reader subsystem is shown to include one display and one window, any suitable number of displays and windows may be used. Additionally, although the card reader subsystem is shown to include both a display and a window, the card reader subsystem may have only a display or only a window. For example, the card reader subsystem may, have only a window when secret game information may not be needed. Alternatively, the card reader subsystem may have only a display when, for example, the game information may be in the machine-readable portion of the game cards.

Data processing subsystem 38 may include any suitable structure configured to obtain game information from card reader subsystem 36 and/or convert that information to one or more game signals responsive, at least in part, to the game information and/or recognizable by DVD player 24. For example, data processing subsystem 38 may include a read-only memory (ROM) 54, a central processing unit (CPU) 56, and a random access memory (RAM) 58.

ROM 54 may include any suitable structure configured to provide one or more predetermined operation programs for CPU 56. The ROM may store those programs in a non-volatile manner. The programs may include programs to receive game information from card reader subsystem 36 and/or convert that information to game signals responsive, at least in part, to the game information and/or recognizable by DVD player 24.

CPU 56 may include any suitable structure configured to run the predetermined operation programs from ROM 54, while RAM 58 may include any suitable structure to store various data required for data processing by CPU 56. Data processing subsystem 38 may include additional components configured to allow the data processing system to obtain game information from card reader subsystem 36 and/or convert that information to game signals responsive, at least in part, to the game information and/or recognizable by DVD player 24. Those additional components may include a hard disk drive, floppy disk drive, CD-ROM drive, keyboard, interface wires/cables, and/or any suitable combination.

Game signals may include signals readable by a conventional DVD player, such as "Up," "Down," "Enter," and "Menu" signals, to cause a specific response by the DVD player. Additionally, the game signals may include specific chapters or time codes corresponding to specific chapters in the DVD game medium.

Communication subsystem 40 may include any suitable structure configured to transmit one or more game signals from data processing subsystem 38 to DVD player 24. For example, the communication subsystem may include a light-emitting diode (LED) 60. Communication subsystem 40 may include additional components configured to allow the communication subsystem to transmit game signals from data processing subsystem 38 to DVD player 24. For example, to facilitate the use of DVD game remote 27' with a variety of different DVD players, communication subsystem 40 also may include universal remote control circuitry, which allows LED 60 to be programmed to communicate with a particular DVD player, such as DVD player 24.

If configured with universal remote control circuitry, LED 60 may be programmed by entering a code corresponding to a particular DVD player. In some embodiments, the DVD game remote may be programmed by directing a signal from another remote to an optional signal detector of the DVD game remote. LED 60 may additionally, or alternatively, be programmed by running an automatic detection query in which DVD game remote 27' transmits different signals until a signal corresponding to a particular DVD player is found. Although the communication subsystem is shown to include an LED for communicating signals, any suitable structure may be used, such as other optical communication mechanisms, radio communication mechanisms, or any other suitable mode configured to send one or more signals to a DVD player.

Figure 5:
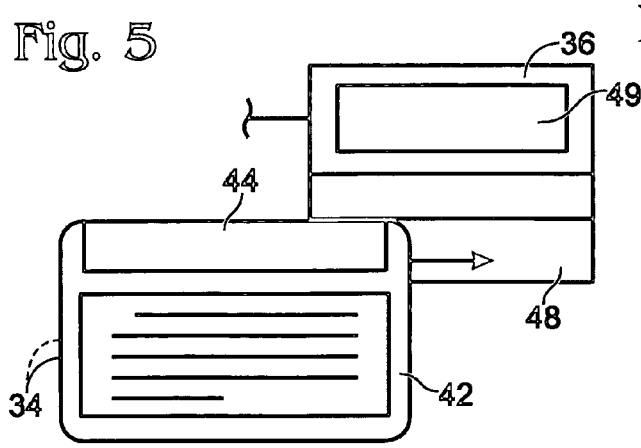
FIG. 5 is a block diagram of another embodiment of a card reader subsystem for the DVD game remote of FIG. 4.

Although DVD game remote 27' is shown to include specific subsystems and specific components within those subsystems, any suitable combination of subsystems and/or components within the subsystems may be used configured to allow players to interact with and/or control DVD gaming system 20. For example, some embodiments of card reader subsystem 36 may not include a card holder. For example, where game cards 34 may be swiped across card reader 48, as shown in FIG. 5, then a card holder may not be required. Additionally, that card holder may not be required if the card reader is passed over the game card, or vice-versa, instead of inserting or swiping the card. Moreover, some or all of data processing subsystem 38 may not be required if the machine-readable portion of game cards 34 includes the game signals for DVD player 24.

Figure 6:
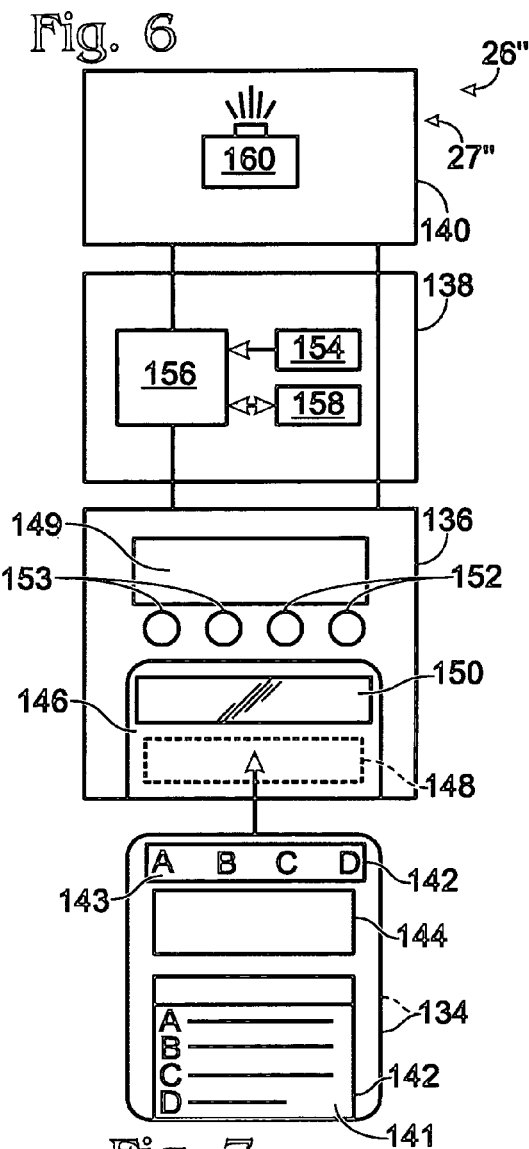
FIG. 6 is a block diagram of another DVD game remote of the DVD gaming system of FIG. 2.

Some embodiments of the DVD game remote system are generally indicated in FIG. 6 at 26", which includes any suitable structure configured to allow players to interact with and/or control DVD gaming system 20. For example, DVD game remote system 26" may include one or more game cards 134, a card reader subsystem 136, a data processing subsystem 138, and a communication subsystem 140. The card reader, data processing, communication subsystems, and/or other suitable subsystems may be referred to as DVD game remote 27", which is configured to obtain game information from the one or more game cards and/or transmit one or more game signals to the DVD player to selectively control the DVD player responsive, at least in part, to the game information. The one or more game signals may be configured to selectively control the DVD player and/or to facilitate game play.

One or more game cards 134 may have any suitable shape and/or size configured to be readable by card reader subsystem 136. Additionally, the game cards may include any suitable structure configured to facilitate game play and/or allow the card reader subsystem to read the cards and obtain game information from those cards. For example, game cards 134 may include one or more player-readable portions 142 and a machine-readable portion 144.

The player-readable portions may include a play portion 141 and a label portion 143. The play portion may include at least one of text, alphanumeric code, symbol, figure, color, and/or any suitable combination configured to facilitate game play. For example, play portion 141 may include one or more questions in text form. The play portion also may include points associated with the questions. Additionally, play portion 141 may include answers to those questions identified by any suitable marks, such as "A," "B," "C," and "D" shown in FIGS. 6-7. Those marks may correspond to the marks in label portion 143. Alternatively, or additionally, the play portion may include one or more answers in text form. Additionally, or alternatively, at least some of the player-readable portion may include concealed game information not readable by the naked eye but readable through a window of the card reader subsystem.

The label portion may include at least one of text, alphanumeric code, symbol, figure, color, and/or any suitable combination configured to label one or more controls of DVD game remote 27". For example, label portion 143 may include suitable marks, such as "A," "B," "C," and "D" shown in FIGS. 6-7, which correspond to the marks used to identify potential answers to the one or more questions (or potential questions to the one or more answers) in play portion 141. Label portion 143 may be located on game cards 134 such that the label portion is visible through windows 150 when the game card is in contact with card reader subsystem 136. Alternatively, or additionally, label portion 143 may include concealed marks not visible to the naked eye but readable through the window of card reader subsystem 136.

Machine-readable portion 144 may include any suitable structure configured to allow card reader subsystem 136 to read the card and obtain game information from that card. For example, the machine-readable portion may include a barcode, a magnetic stripe, a microprocessor (such as those used in smart cards or integrated circuit cards), punched holes, and/or any suitable combination. The machine-readable portion may store any suitable game information, such as questions, question categories, answers, specific chapters or time codes on the DVD game medium to be played, points associated with the questions and/or answers, etc.

Figure 7:
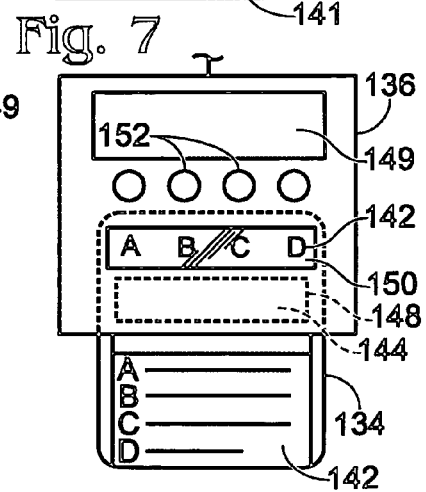
FIG. 7 is a block diagram of the card reader subsystem of the DVD game remote of FIG. 6 showing a game card in the card reader subsystem.
Figure 10:
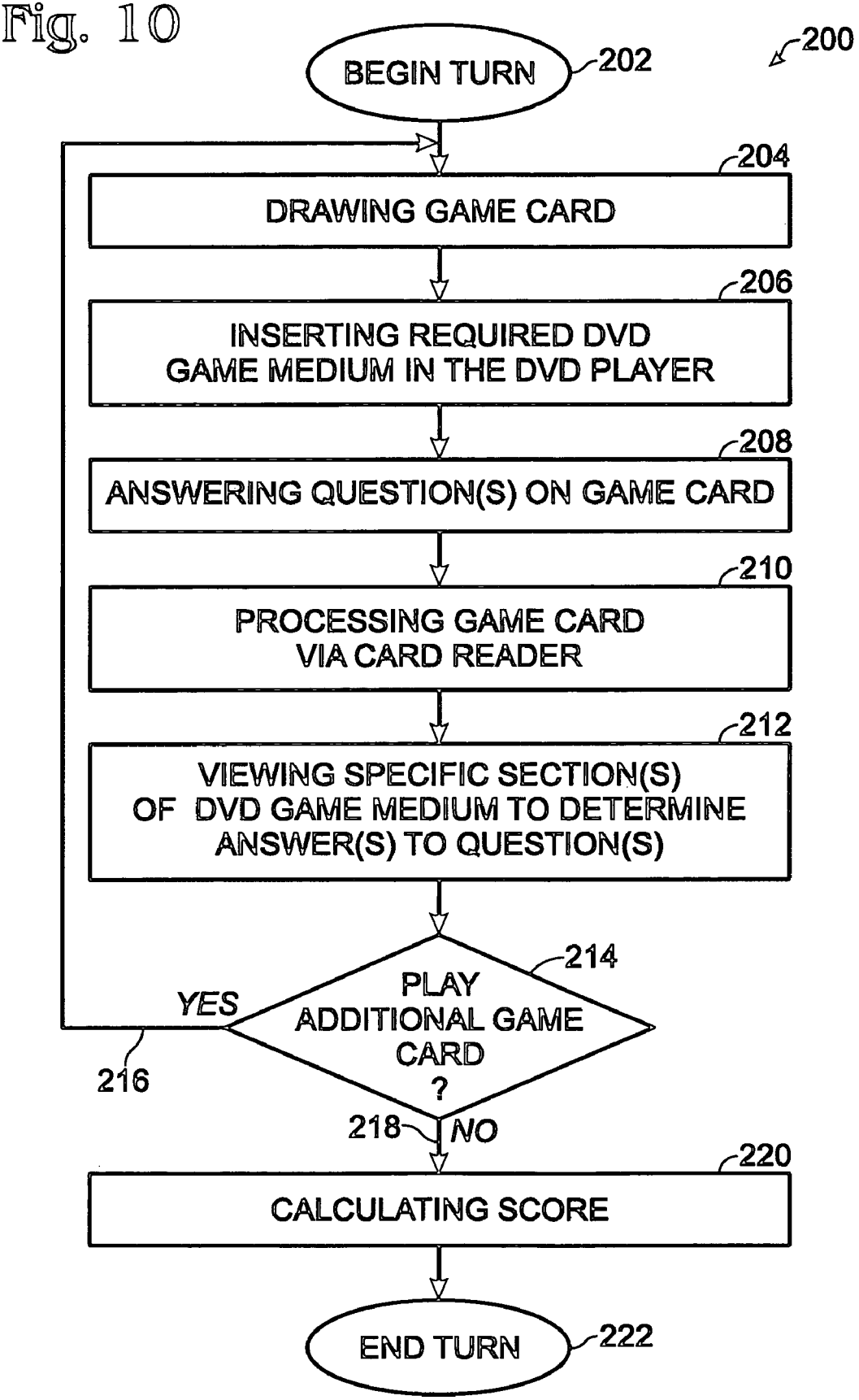
FIG. 10 is a flowchart describing a method of play of a game using the DVD gaming system of FIG. 2.

Although the player-readable and machine-readable portions are shown in specific locations on game cards 134, those portions may be in any suitable location on game cards 134. Additionally, although the player-readable and machine-readable portions are shown in FIGS. 6-7 to have specific sizes, those portions may be any suitable size. Moreover, although only two player-readable portions and one machine-readable portion are shown, any suitable number of player-readable and/or machine-readable portions may be used. Furthermore, although the player-readable and machine-readable portions are shown to be on the same side of game cards 34, those portions may be on different sides of the game cards, both sides of the cards, or any suitable combination.

Card reader subsystem 136 may include any suitable structure configured to obtain game information from game cards 134 and/or provide at least some of that information to data processing subsystem 138. For example, the card reader subsystem may include a card holder 146, a card reader 148, a display 149, one or more windows 150, and one or more player controls 152. Card holder 146 may include any suitable structure configured to secure and/or contact one or more game cards 134 to allow card reader 148 to obtain game information from those cards. For example, card holder 146 may include guiding rails, card inlets, card outlets, belts, motors, guides, rollers, and/or any suitable combination.

Card reader 148 may include any suitable structure configured to obtain game information from one or more cards 134. For example, card reader 148 may include one or more optical sensors configured to read barcodes, one or more magnetic heads configured to read magnetic stripes, one or more integrated circuit interfaces configured to connect to and access microprocessors, and/or any suitable combination. Card reader 148 may include additional suitable components configured to allow the card reader to obtain game information from cards 134, such as belts, motors, guides, rollers, and/or any suitable combination. For example, where the game card includes a magnetic stripe and is held stationary by card holder 146, then card reader 148 may include motors, rollers, and/or the like to allow one or more magnetic heads to move relative the game card and/or to read that magnetic stripe.

Display 149 may include any suitable structure configured to display at least some of the game information from the machine-readable portion of game cards 134. For example, display 149 may be in the form of a liquid crystal display (LCD), light emitting diodes (LED) display, etc. Display 149 may be used to provide "secret" game information to the player that is not displayed in television 28 to the other players.

Windows 150 may include any suitable structure configured to allow the player see the player-readable portions when the game card is in the card reader subsystem and/or to identify the functions of the player controls for the game. For example, windows may be in the form of one or more clear sections in the card reader subsystem. As shown in FIG. 7, the clear section allows the player to view label portion 143 and identify the functions of player controls 152 when the game card is in the card reader subsystem. Additionally, or alternatively, the windows may be in the form of one or more reading filter sections configured to allow the player to read the concealed game information on the player-readable portions of game cards 134. For example, the windows may include a "red-filter" configured to reveal concealed game information on game cards 134. Alternatively, windows 150 may be any suitable combination of clear and reading filter sections.

Player controls 152 include any suitable structure configured to facilitate game play. For example, player controls 152 are shown to include one or more buttons 153, which may correspond to various commands associated with a particular game. Those commands may be identified by label portion 143 on game cards 134. The buttons may be mapped to correspond to signals readable by a conventional DVD player, such as "Up," "Down," "Enter," and "Menu" signals, to cause a specific response by the DVD player. For example, DVD game medium may include a timer that may be started and/or stopped by pressing one or more of the player controls. Additionally, the player controls may provide the ability for a player to select among different answers (and/or questions) on the game card and have the DVD player and the DVD game medium determine if the selected answer (and/or question) is correct.

Although player controls 152 are shown in FIGS. 6-9 to include buttons, any suitable structure configured to facilitate game play may be used, such as levers, pull cords, rotating elements, etc. Additionally, although four player controls are shown, any suitable number of player controls may be used. Moreover, although the player controls are shown to include only buttons, any suitable combination of controls may be used.

Card reader subsystem 136 may include additional suitable components configured to allow the card reader subsystem to obtain game information from game cards 134 and/or provide that information to data processing subsystem 138. For example, the card reader subsystem may include interfaces, such as interface wires, interface cables, etc. Examples of card reader subsystems are provided in U.S. Pat. Nos. 6,830,182; 6,826,628; 6,761,310; and 6,742,706. The complete disclosures of those patents have been incorporated by reference for all purposes.

Although the card reader subsystem is shown to include two windows and one display, any suitable number of windows and displays may be used. Additionally, although the card reader subsystem is shown to include both windows and a display, the card reader subsystem may have only windows or only a display. For example, the card reader subsystem may have only windows when secret game information may not be needed. Alternatively, the card reader subsystem may have only a display when, for example, the questions and/or answers may be in the machine-readable portion instead of the player-readable portion of the game cards. Also, the card reader subsystem may have only one window and one display, where the display may identify the functions of the player controls.

Moreover, although the card reader subsystem and the game cards are shown to be configured a specific way in FIGS. 6-7, that subsystem and those game cards may be configured in any suitable way. For example, card reader subsystem 136 may be configured such that label portion 143 is not required. As shown in FIGS. 8-9, player controls 152 may be located adjacent to play portion 141. The play portion may thus identify the commands associated with player controls 152 without label portion 143.

Alternatively, or additionally, the card reader subsystem may include one or more faces (not shown) that identify the commands associated with the player controls. The game cards and/or any other component of the DVD gaming system may identify which face should be used. Alternatively, the card reader subsystem may be configured such that the game card covers the player controls and the player may press the appropriate section of the label portion to activate the selected player control.

Data processing subsystem 138 may include any suitable structure configured to obtain game information from card reader subsystem 136 and/or convert that information to game signals responsive, at least in part, to the game information and/or recognizable by DVD player 24. For example, data processing subsystem 138 may include a read-only memory (ROM) 154, a central processing unit (CPU) 156, and a random access memory (RAM) 158.

ROM 154 may include any suitable structure configured to provide one or more predetermined operation programs for CPU 156. The ROM may store those programs in a non-volatile manner. The programs may include programs to accept game information from card reader subsystem 136 and/or convert that information to game signals responsive, at least in part, to the game information and/or recognizable by DVD player 24.

CPU 156 may include any suitable structure configured to run the predetermined operation programs from ROM 154, while RAM 158 may include any suitable structure to store various data required for data processing by CPU 156. Data processing subsystem 138 may include additional components configured to allow the data processing system to obtain game information from card reader subsystem 136 and/or convert that information to game signals responsive, at least in part, to the game information and/or recognizable by DVD player 24. Those additional components may include a hard disk drive, floppy disk drive, CD-ROM drive, keyboard, interface wires/cables, and/or any suitable combination.

Game signals may include signals readable by a conventional DVD player, such as "Up," "Down," "Enter," and "Menu" signals, to cause a specific response by the DVD player. Additionally, the game signals may include specific chapters or time codes corresponding to specific chapters in the DVD game medium.

Communication subsystem 140 may include any suitable structure configured to transmit game signals from data processing subsystem 138 and/or card reader subsystem 136 to DVD player 24. For example, the communication subsystem may include a light-emitting diode (LED) 160. Communication subsystem 140 may include additional components configured to allow the communication subsystem to transmit game signals from data processing subsystem 138 and/or card reader subsystem 136 to DVD player 24. For example, to facilitate the use of DVD game remote 27" with a variety of different DVD players, communication subsystem 140 also may include universal remote control circuitry, which allows LED 160 to be programmed to communicate with a particular DVD player, such as DVD player 24.

If configured with universal remote control circuitry, LED 160 may be programmed by entering a code corresponding to a particular DVD player. In some embodiments, the DVD game remote may be programmed by directing a signal from another remote to an optional signal detector of the DVD game remote. LED 160 may additionally, or alternatively, be programmed by running an automatic detection query in which DVD game remote 27" transmits different signals until a signal corresponding to a particular DVD player is found. Although the communication subsystem is shown to include an LED for communicating signals, any suitable structure may be used, such as other optical communication mechanisms, radio communication mechanisms, or any other suitable mode configured to send one or more signals to a DVD player.

Although DVD game remote 27" is shown to include specific subsystems and specific components within those subsystems, any suitable combination of subsystems and/or components within the subsystems may be used configured to allow players to interact with and/or control DVD gaming system 20. For example, some or all of data processing subsystem 138 may not be required if the machine-readable portion of game cards 134 includes the game signals for DVD player 24.

Various games may be played with DVD gaming system 20 having DVD game remote 26, such as DVD game remotes 26' and/or 26" illustrated in FIGS. 4-9. For example, a method of playing some of the many possible games is indicated generally at 200 in FIG. 8. A player begins his or her turn at 202. The player draws a card from the game cards at 204. That player may be required to draw the card in any suitable way. For example, the game cards may be shuffled and stacked with the player taking a card from the stack. Alternatively, or additionally, the game cards may be arranged in specific categories with one or more players (including the current player) selecting a game card(s) from the category in which the first or designated player selected from. Those categories may be based on any suitable criteria, including the different types of DVD game media available and/or on a specific DVD game medium. For example, the game cards may be categorized by specific movies on the DVD game media and the first, designated, and/or current player selects which specific movie he or she would like to answer questions on.

The player inserts the DVD game medium that is required by the drawn card into the DVD player at 206. The player then answers one or more questions on the player-readable portion of the card at 208. Prior to answering the one or more questions on the game card, those questions may be read aloud by the player, an opposing player, a person not participating in the game, and/or any suitable person.

After answering the one or more questions, the player processes the game card via the card reader on the DVD game remote at 210. Processing the game card via the card reader may include inserting the game card into the card reader subsystem, sliding the game card across the card reader subsystem, sliding the DVD game remote across the game card, and/or any suitable method configured to allow the card reader to obtain the game information from the game card and to allow the DVD game remote to transmit one or more game signals responsive, at least in part, to the game information. In some embodiments, processing the game card via the card reader does not require physical contact between the game card and the card reader. The card reader reads the machine-readable portion of the game card and sends the appropriate signals to the DVD player. That DVD player then plays one or more specific sections of the DVD game medium to reveal the answers to the one or more questions at 212.

The player then determines if an additional card (or the other side of the card where the card has questions on both sides) will be played at 214. The player may draw an additional card when one or more questions on the current game card are answered correctly, when all the questions on the current game card are answered correctly, and/or any suitable scenario. Alternatively, step 214 and node 216 may be eliminated in some embodiments and the player may never draw an additional card in those embodiments.

If an additional card (or side) is to be played at 216, then the player draws a card at 204. However, if an additional card is not to be played at 218, then the player calculates his or her score at 220 and ends the turn at 222. The score may be calculated in any suitable way based on whether the player answered correctly and/or incorrectly. For example, the one or more questions on the game card may include associated points and the player receives points by answering the questions correctly. Additionally, or alternatively, the player's score may be deducted by answering the questions incorrectly. In some embodiments, the DVD gaming system may calculate and keep track of the scores of the players by using, for example, the onboard memory of the DVD player.

Players take turns going through method 200 and the goal may be to play successive rounds until a suitable stopping point. Suitable stopping points may be based on time, score, number of game cards remaining, and/or any suitable combination. Additionally, method 200 may include any suitable preparation steps before beginning the game. For example, all the required DVD game media may be prepared and the DVD player, DVD game remote, and/or television may be switched on before beginning the game.

Method 200 may, however, be performed in different sequences and in different combinations, not all steps being required for all embodiments of the DVD gaming system. Alternatively, or additionally, method 200 may be modified in any suitable way. For example, step 206 may be performed as a preparation step if only one DVD game medium is to be used for a particular turn or for the entire game. Additionally, the game cards may include one or more answers (instead of questions), step 208 may require player to phrase an appropriate question to the answers, and/or step 212 may play a specific section of the DVD game medium that reveals the appropriate question. Moreover, although the method is described as being performed by a player, a team of two or more players may perform the method. Furthermore, although method 200 is described as a game that involves at least two opposing players taking turns, the game may be played by only one player or by one player against one or more virtual players created by the DVD gaming system.

Another method of playing some of the many possible games with DVD gaming system 20 having DVD game remote 26, such as DVD game remotes 26" illustrated in FIGS. 6-9, is indicated generally at 300 in FIG. 11. A player begins his or her turn at 302 and starts the timer by activating one or more of the player controls at 304. The player then draws a card from the game cards at 306.

That player may be required to draw the card in any suitable way. For example, the game cards may be shuffled and stacked with the player taking a card from the stack. Alternatively, or additionally, the game cards may be arranged in specific categories with one or more players (including the current player) selecting a game card(s) from the category in which the first or the designated player selected from. Those categories may be based on any suitable criteria, including the different types of DVD game media available and/or on a specific DVD game medium.

The player inserts the drawn game card into the card reader subsystem at 308. DVD player then plays one or more specific sections of the DVD game medium at 310 to display on the television one or more questions, categories, clues, and/or any suitable combination. The player then reads potential answers on the game card via the window on the card reader subsystem at 312, and selects an answer at 314. If the player is part of a team, that player may announce or call out the answers on the game card before selecting an answer for the team.

Once an answer is selected, the player activates the player control on the DVD game remote corresponding to the selected answer at 316. The DVD player receives the signal from the DVD game remote and initiates a script contained in the DVD game medium in response to the signal. Specifically, the DVD player and/or the DVD game medium determine if the selected answer is correct at 318, and game play continues via return node 319. The DVD player and/or the DVD game medium may display the selected answer, whether the selected answer was correct, the score based on the selected answer, and/or any suitable information. After one or more of steps 306-318, the timer is checked to see if it has ended at 320. If the timer has not ended, then game play continues via node 322. However, if the timer has ended, then the player's total score is calculated at 326.

The total score may be calculated by the DVD player and/or DVD game medium. That total score also may be displayed on the television. Alternatively, or additionally, the total score may be calculated by one or more of the players. The score may be calculated in any suitable way based on whether the player answered correctly and/or incorrectly. For example, the one or more questions on the game card may include associated points and the player receives points by answering the questions correctly. Additionally, or alternatively, the player's score may be deducted by answering the questions incorrectly. The player's turn ends at 328.

Players take turns going through method 300 and the goal may be to play successive rounds until a suitable stopping point. Suitable stopping points may be based on total time, score, number of game cards remaining, and/or any suitable combination. Additionally, method 300 may include any suitable preparation steps before beginning the game. For example, all the required DVD game media may be prepared and the DVD player, DVD game remote, and/or television may be switched on before beginning the game.

Method 300 may, however, be performed in different sequences and in different combinations, not all steps being required for all embodiments of the DVD gaming system. Alternatively, or additionally, method 300 may be modified in any suitable way. For example, a timer may not be used and play may be regulated in any other suitable method, such as whether questions were answered correctly. Additionally, return node 319 may not present and the player only gets to draw one game card. Moreover, the specific section of the DVD may include one or more answers (instead of questions) at 310, which would require the player to read potential questions that is appropriate to the answer at 312, select the appropriate question at 314, and activate the appropriate player control at 316. Additionally, although the method is described as being performed by a player, the method may be performed by a team of two or more players. Furthermore, although method 200 is described as a game that involves at least two opposing players taking turns, the game may be played by only one player or by one player against one or more virtual players created by the DVD gaming system.

Additionally, methods 200 or 300, and other possible games may be played with game cards 34 and a conventional DVD remote. For example, game cards 34 or 134 may contain instructions on which chapters of the DVD to play. Instead of processing the game card via the card reader at 210, or inserting the game card in the card reader at 308, the player may follow the instructions on that card to play the specific chapter(s) on the DVD game medium using a conventional DVD player remote and/or by manipulating the appropriate controls on the DVD player.

Other games may be played with DVD gaming system 20 having DVD game remote 26, such as DVD game remotes 26' and/or 26" illustrated in FIGS. 4-9. For example, the game cards may include battling entities, armies, chess pieces, etc. with associated points. Each player may select the card that he or she wants to use for the particular conflict. The card reader subsystem may read those cards and send game information relating to those cards to the data processing subsystem. That data processing system may interpolate the points of the cards, determine the outcome of the conflict based on the information it was provided, and then send game signals to the DVD player via the communication subsystem. The DVD player may play one or more specific chapters that visually show the conflict and its outcome.

Although gaming systems and features of gaming systems have been shown and described with reference to the foregoing operational principles and preferred embodiments, those skilled in the art will find apparent that various changes in form and detail may be made without departing from the spirit and scope of the claims. The present disclosure is intended to embrace all such alternatives, modifications, and variances that fall within the scope of the appended claims.

What is claimed is:

1. A method of playing a game with a DVD game remote and a DVD player having a DVD game medium that includes a plurality of chapters that at least substantially contains audiovisual information having a sequence of consecutive images providing a predetermined storyline, comprising:
   drawing a game card having game information, wherein the game card includes one or more questions regarding the audiovisual information having a sequence of consecutive images providing a predetermined storyline contained in the plurality of chapters;
   reading at least one of the one or more questions on the drawn game card;
   answering the at least one of the one or more questions on the drawn game card:
   processing the drawn game card via a card reader of the DVD game remote;
   viewing one or more chapters from the plurality of chapters that at least substantially contains audiovisual information having a sequence of consecutive images providing a predetermined storyline of the DVD game medium, wherein the one or more chapters viewed are selected from the plurality of chapters in response to processing of the drawn game card; and
   confirming whether the at least one of the one or more questions was answered correctly based on the viewing of the one or more chapters.

2. The method of claim 1, wherein processing the game card includes inserting the game card into the card reader of the DVD game remote.

3. The method of claim 1, wherein the game card includes two or more answers for each of the one or more questions.

4. The method of claim 3, wherein answering the at least one of the one or more questions includes activating a player control of the DVD game remote associated with one of the two or more answers.

5. The method of claim 4, wherein confirming whether the at least one of the one or more questions that was read from the drawn card was answered correctly includes determining whether the player control associated with the correct answer was activated.

6. The method of claim 1, wherein the plurality of chapters of the DVD game medium at least substantially includes at least one of a pre-recorded movie and a television show.

7. The method of claim 6, wherein the game card includes at least one question regarding the at least one of a pre-recorded movie and a television show contained in the plurality of chapters of the DVD game medium.

8. A method of playing a game with a DVD game remote and a DVD player having a DVD game medium that includes a plurality of chapters that at least substantially contains audiovisual information having a sequence of consecutive images providing a predetermined storyline, comprising:

drawing a game card having game information, wherein the game card includes one or more answers regarding the audiovisual information having a sequence of consecutive images providing a predetermined storyline contained in the plurality of chapters;

reading at least one of the one or more answers on the drawn game card;

asking a question that the at least one of the one or more answers responds to;

processing the drawn game card via a card reader of the DVD game remote;

viewing one or more chapters from the plurality of chapters that at least substantially contains audiovisual information having a sequence of consecutive images providing a predetermined storyline of the DVD game medium, wherein the one or more chapters viewed are selected from the plurality of chapters in response to processing of the drawn game card; and confirming whether the correct question was asked based on the viewing of the one or more chapters.

\* \* \* \* \*